United States Patent
Maganas

(10) Patent No.: US 8,512,215 B2
(45) Date of Patent: *Aug. 20, 2013

(54) METHOD FOR ENHANCED ENERGY PRODUCTION FROM TRANSFORMING, REDUCING AND ELIMINATING ORGANIC MATERIAL AND MEDICAL WASTE

(76) Inventor: Thomas C. Maganas, Manhattan Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/290,069

(22) Filed: Nov. 5, 2011

(65) Prior Publication Data

US 2013/0086905 A1    Apr. 11, 2013

Related U.S. Application Data

(63) Continuation-in-part of application No. 13/253,804, filed on Oct. 5, 2011, now Pat. No. 8,283,512.

(51) Int. Cl.
*B09B 3/00* (2006.01)

(52) U.S. Cl.
USPC ........ 588/249.5; 588/301; 588/311; 588/313; 201/19; 422/186

(58) Field of Classification Search
CPC ............ B09B 3/0075; F23G 5/00; F23G 5/30
USPC ............... 588/313, 249.5, 311, 301; 165/74; 422/186; 201/19
See application file for complete search history.

(56) References Cited

U.S. PATENT DOCUMENTS

| | | | |
|---|---|---|---|
| 2,956,865 A | 10/1960 | Williams, Sr. | |
| 3,632,304 A | 1/1972 | Hardison | |
| 3,714,071 A | 1/1973 | Michalko | |
| 3,841,242 A | 10/1974 | Sigg | |
| 3,915,890 A | 10/1975 | Soldate | |
| 3,922,975 A | 12/1975 | Reese | |
| 4,052,173 A | 10/1977 | Schulz | |
| 4,308,806 A | 1/1982 | Uemura et al. | |
| 4,330,513 A | 5/1982 | Hunter et al. | |
| 4,392,346 A * | 7/1983 | Fink ................................ 60/774 |

(Continued)

FOREIGN PATENT DOCUMENTS

| | | |
|---|---|---|
| EP | 0176123 | 4/1986 |
| EP | 0605719 | 7/1994 |

(Continued)

OTHER PUBLICATIONS

Shafey et al. Experimental Study on a Bench-Scale, Batch-Type Fluidized-Bed Combustor for Energy Production From Waste-Derived Fuels, 331-338, Energy, vol. 17, No. 4 (1992).

(Continued)

*Primary Examiner* — Nina Bhat
(74) *Attorney, Agent, or Firm* — Workman Nydegger

(57) ABSTRACT

A waste transformation and destruction apparatus includes a natural gas ignition system, a silica material bed, a heat transfer device, and a system for collecting plasma produced energy. A reaction formed by heat from ignition, carbon from the waste material, supercritical water, —OH radicals, and muons released from the silica bed transform the waste into a fuel. This fuel is more efficiently consumed by the complete combustion process resulting in near total elimination of the waste, increased energy production, and virtually no emissions.

26 Claims, 5 Drawing Sheets

(56) References Cited

U.S. PATENT DOCUMENTS

| | | | |
|---|---|---|---|
| 4,452,048 A * | 6/1984 | Geary et al. | 60/656 |
| 4,497,637 A | 2/1985 | Purdy et al. | |
| 4,623,400 A | 11/1986 | Japka et al. | |
| 4,701,312 A | 10/1987 | Kice | |
| 4,708,067 A | 11/1987 | Narisoko et al. | |
| 4,724,776 A | 2/1988 | Foresto | |
| 4,761,270 A | 8/1988 | Turchan | |
| 4,886,001 A | 12/1989 | Chang et al. | |
| 4,974,531 A * | 12/1990 | Korenberg | 110/346 |
| 4,977,840 A | 12/1990 | Summers | |
| 4,991,521 A | 2/1991 | Green et al. | |
| 5,010,830 A | 4/1991 | Asuka et al. | |
| 5,178,101 A | 1/1993 | Bell | |
| 5,181,795 A | 1/1993 | Circeo, Jr. et al. | |
| 5,207,734 A | 5/1993 | Day et al. | |
| 5,335,609 A | 8/1994 | Nelson et al. | |
| 5,347,936 A | 9/1994 | Thorhuus | |
| 5,676,070 A * | 10/1997 | Maganas et al. | 110/245 |
| 5,928,618 A | 7/1999 | Maganas et al. | |
| 6,235,247 B1 | 5/2001 | Maganas et al. | |
| 6,520,287 B2 | 2/2003 | Maganas et al. | |
| 6,962,681 B2 | 11/2005 | Maganas et al. | |
| 8,128,716 B2 * | 3/2012 | Krumm et al. | 48/77 |
| 8,282,886 B2 * | 10/2012 | Glover et al. | 422/141 |
| 8,283,512 B1 * | 10/2012 | Maganas | 588/313 |
| 2005/0211143 A1 * | 9/2005 | May et al. | 110/345 |

FOREIGN PATENT DOCUMENTS

| | | |
|---|---|---|
| FR | 2687765 | 2/1992 |
| FR | 2701223 | 8/1994 |
| GB | 541962 | 12/1941 |
| JP | 55-24597 | 7/1979 |
| JP | 358095192 | 6/1983 |
| JP | 5-115752 | 2/1992 |
| WO | 9324207 | 12/1993 |

OTHER PUBLICATIONS

Biozone Scientific, Hydroxyls: Powerful air Purification, www.extrapureair.com, pp. 1-3 (Jun. 19, 2002).

Combustion Research Facility News, *Raman probe validates oxidation model in supercritical water*, Sandia National Laboratories, vol. 17, No. 5 (Sep./Oct. 1995).

Hydroxyl Radical Source, The Hydroxyl Radical; Sources and Measurement, www.chem.leeds.ac.uk, p. 1 of 2, (Jun. 24, 2002).

Marrone, Philip A., Supercritical Water Oxidation, web.mit-.edu, p. 1 of 1, (Jun. 24, 2002).

Scientific American, Paving Out Pollution, 2 pgs., www.s-ciam.com (Jun. 24, 2002).

Non-Final Office Action mailed Aug. 30, 2000 in U.S. Appl. No. 09/257,458.

\* cited by examiner

METHOD FOR ENHANCED ENERGY PRODUCTION FROM TRANSFORMING, REDUCING AND ELIMINATING ORGANIC MATERIAL AND MEDICAL WASTE

CROSS-REFERENCE TO RELATED APPLICATION

This application is a continuation-in-part of U.S. patent application Ser. No. 13/253,804, filed Oct. 5, 2011, which is incorporated by reference.

BACKGROUND OF THE INVENTION

1. Field of the Invention

The invention is in the field of transformation of fossil fuels, biomass, medical waste and organic waste into energy production and the field of reduction and elimination of medical waste and organic waste.

2. Review of Technology

Conventional energy production from organic fuel materials relies on combustion of organic materials into their combustion products. The most favorable combustion products do not include carbon-carbon bonds and carbon-hydrogen bonds because such products indicate incomplete combustion, and thereby there is still combustion potential that was not utilized for energy production. When combustion is incomplete, there usually is some environmental concern for the organic combustion products, which can be desirable to clean or degrade before being released from the combustion system. The incomplete combustion of carbon-containing fuels such as gasoline, diesel fuel, fuel oil, coal, wood, biomass and even natural gas can result in the generation of pollutants such as carbon particulates, hydrocarbons, soot, oily substances, carbon monoxide (CO), and other pollutants. Such pollutants collect in the atmosphere and can cause all manner of health problems and smog.

For example, in response to pollution caused by gasoline-powered internal combustion engines, catalytic converters have been developed and mandated to reduce the levels of incomplete combustion pollutants emitted into the environment by gasoline powered vehicles. Catalytic converters are typically positioned in-line with the exhaust and muffling system of an internal combustion engine and are generally able to catalytically convert only trace amounts of the un-burnt hydrocarbons and CO into $CO_2$ and water. Although modern catalytic converters can be used to convert trace amounts of un-burnt hydrocarbons and CO into carbon dioxide ($CO_2$) and water, they are generally only feasible for use with relatively clean burning systems such as gasoline-powered vehicles.

Additionally, industrial burners, such as those that burn coal, fuel oil, or natural gas can also suffer from incomplete combustion. In response to pollution controls directed to industrial burners, sophisticated scrubbers and after burners have been developed in attempts to reduce environmental pollution. However, these and other pollution reduction means can be quite expensive, both in retrofitting older industrial burners as well as in the fabrication of new ones. None of these existing systems result is a substantial reduction of pollutants.

Incomplete combustion can also be problematic in the degradation of biological waste such as medical waste and animal corpses. Traditionally, disposal and degradation of biological waste has been performed by incineration and combustion of the organic materials within the waste. The disposal of medical waste in a manner that will not release dangerous pathogenic or disease-causing agents into the environment has always been a relatively expensive and difficult task. This is because it is necessary to first kill all pathogenic or potentially pathogenic agents, and then completely destroy the tissue to prevent further rotting and decay of the tissue. Otherwise, the tissue can provide a haven where later-introduced foreign pathogenic agents can thrive. For instance, it is inadequate to simply sterilize once-living human tissue and then dispose of it like ordinary refuse where it will be exposed to bacteria or other natural biodegradation agents. In the process of natural degradation, human infection-causing agents can find their way to the discarded human tissue, where they can thrive and then reinfect others.

Sterilization of medical waste typically requires manual microwaving or autoclaving followed by incineration to destroy the biological waste. This process has proved inadequate as a means to ensure total destruction of all pathogenic agents, including viruses. This is because of the inability to achieve complete combustion or destruction of all viruses or other pathogenic agents before they find their way out the smoke stack, or flue, of the incinerator. While incomplete combustion and degradation of biological waste may have different environmental consequences compared to incomplete combustion of organic fuels, it is still desirable to obtain the complete degradation of the biological waste for safety and avoidance of environmental concerns.

Accordingly, it would be advantageous to provide methods and systems that could effectively and inexpensively eliminate, or at least substantially reduce, the quantity of un-burnt or partially burnt combustion products from organic fuels and biological waste in an economically feasible manner. It would also be advantageous to provide methods and systems for eliminating, or at least greatly reducing, the quantity of incomplete combustion products which would eliminate the need for expensive catalysts, such as palladium, platinum and other rare and expensive metals. Additionally, it would be advantageous to provide methods and systems that can degrade biological waste and completely destroy infectious and potentially harmful biological materials.

BRIEF SUMMARY OF THE INVENTION

The present invention relates to methods and systems for transformation of organic waste, medical waste, coal, fossil fuels, and biomass into thermal energy and the substantial reduction and near elimination of these materials. The invention eliminates the conventional need for manual use of microwave energy followed by autoclave incineration to destroy medical waste, which can require over two hours at a temperature of over 2000° F. and produces a stream of unburned waste, pollutants, soot and odors.

The disclosed process eliminates essentially 100% of all organic waste, medical waste, toxic waste, polymeric materials such as PVC (polyvinyl chloride) plastics, and efficiently transforms them into a new intermediate fuel, which helps to complete the combustion process and more completely reduce and eliminate the materials with no significant emissions. Combustion typically involves intermediate transformations of solid or liquid organic materials into gases, which react with oxygen to form heat and gaseous combustion products. The disclosed process initially transforms organic materials into a new intermediate type of high powered gaseous fuel that is completely consumed and converted into energy, eliminating emissions. It does this by more efficiently cracking cellulosic molecular bonds and other inorganic elements found in organic matter and separating the intermediate gaseous compounds within milliseconds of the beginning of the reaction. CO (carbon monoxide), sulfur, and all 17 inorganic elements typically present in emissions are cracked, completely combusted, and eliminated. This produces complete combustion and the elimination of all pollutants.

The transformation of organic matter to a new super fuel and Complete Combustion™ was first discovered by Tom Maganas in 2002. The research was testing a process for elimination of soot and other organic emissions from a diesel engine utilizing hydroxyl (—OH) radicals, supercritical water, and muon radicals at high top compression and temperature. Research was then extended to test the process for eliminating medical waste and organic waste.

The experimental chamber for medical waste disposal is a cylindrical reactor 16 inches in diameter and 44 inches tall that contains a bed of pebbles, silica that releases OH radicals into the plasma and a cradle cage that suspends the waste above the plasma reaction. A monomolecular nano film coats the entire interior. This nano film is deposited during initial use of the reactor and thereafter helps to catalyze the reactions. Ignition is provided by natural gas, which raises the temperature of the reaction chamber from room temperature to an initial ignition temperature of about 540° C.

After the reactor is heated to 540° C., the cage containing medical waste is lowered into the reaction chamber through a hole in the top and suspended above the silica. The gas fire is stopped. Heat in the reactor begins to transform the medical waste, which releases gases. Gases within the chamber interact with the silica to form hydroxyl radicals, supercritical water, muons, and other highly reactive free radical species within the reaction chamber. The nano film enhances the reactive environment.

After initially dropping, the temperature again rises within a few minutes and stabilizes at 540° C. The intermediate gases produced from the transformed organic waste create a new intermediate fuel that combusts completely and quickly increases the temperatures in the reactor, which can reach up to 940° C. At this point, heat generation is self-sustaining without further input of flammable gas. Depending on the medical waste load, temperatures above 540° C. can be maintained for about 60 minutes. When the temperature drops, that is an indication that the fuel has been consumed. The process consumes 100% of organic waste, typically leaving about 20% incombustible valuable inorganic matter as a byproduct with zero emissions.

Eight months of research involving organic medical waste led to a decision to test coal energy against organic waste energy using the same test methods as in medical waste tests. Soft and hard Appalachian coal were divided, separated and tested with ten pound coal loads using the same methodology. The coal produced sufficient heat energy to maintain a steady, self-sustaining temperature of 500° C. to 570° C. for 90 minutes before running out, with essentially zero odors and atmospheric emissions. Depending on the ash content of the coal, the tests caused a weight loss of about 80% weight loss, leaving about 20% of incombustible inorganic matter as a byproduct.

Anthracite coal has a BTU (British thermal units) content of about 11,000 BTU per pound, while lignite coal contains about has 6,000 BTU per lb. By comparison, cow leg bones used as "medical waste" have a BTU content of less than 100 BTU per lb, yet the experiments demonstrated a repeatable temperature rise to 990° C. when using cow leg bones, while the maximum coal temperature was 570° C. The disclosed process was able to more efficiently and controllably extract thermal energy from both coal and cow leg bones compared to conventional combustion methods. The foregoing claims are fully documented, and surpass Clean Air Act requirements.

The inventive methods and systems convert fossil fuel, biomass and/or medical waste into thermal energy and efficiently destroy medical waste by means of a plasma within the reaction chamber, which destroys organic matter, including medical and other toxic wastes, such as polyvinyl chloride (PVC), with a weight loss of 80% to 90% within 60 minutes without burning or producing soot, odors, fumes, and toxic gas emissions to the atmosphere as are commonly produced using conventional incineration.

A heat generation reactor can be configured for efficient and clean conversion of organic materials into heat energy. Such a reactor can include: a reaction chamber; a thermally insulating monomolecular nano film permanently installed on an interior surface of the reaction chamber; an initial heat generation source located within the reaction chamber; an air source fluidly coupled with the reaction chamber; and silica particles located within the reaction chamber. The monomolecular film is comprised of dwarfed aligned molecules of carbon having dimensions of 30 angstroms by 50 angstroms, which elongate to 70 angstroms at high pressure. Though highly thermally insulating, the monomolecular film may behave as a semiconductor to produce electrical energy (e.g., as a plasma).

Thus, the present invention relates to the manufacture of a semiconductor material for use in making microprocessors, computer chips, transistors, or photovoltaic solar cells. The semiconductor material comprises a substrate, such as those commonly used in the semiconductor industry, and a single layer of a monomolecular nano film comprised of aligned carbon molecules having dimensions of 30 angstroms by 50 angstroms and that elongate to 70 angstroms at high pressure resulting in substantial increase in temperature resistance, and operating capabilities The silica particles, when exposed to heat from the heat generation source and organic fuel generate and with air flowing up from the bottom, generate a reactive atmosphere of hydroxyl radicals, supercritical water, muons and/or other reactive species. A support element is configured to support an organic fuel material above the silica and includes at least one support surface with one or more apertures that permit passage of air to increase plasma efficiency and assist in the complete combustion of the fuel.

A method for efficiently and cleanly converting organic material into heat energy can include: providing a reactor as described herein; introducing a biological or other organic material into the reaction chamber so as to be located above the silica; introducing heat and airflow into the reaction chamber so as to generate hydroxyl radicals, supercritical water, muons and/or other reactive species that can interact with the organic material; and converting the organic material into heat energy.

Clean energy can be produced using a heat exchanger element thermally coupled with the reaction chamber and providing components for converting heat energy into electrical energy. For example, electricity can be generated from a steam generator thermally coupled with the heat exchanger element.

These and other embodiments and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
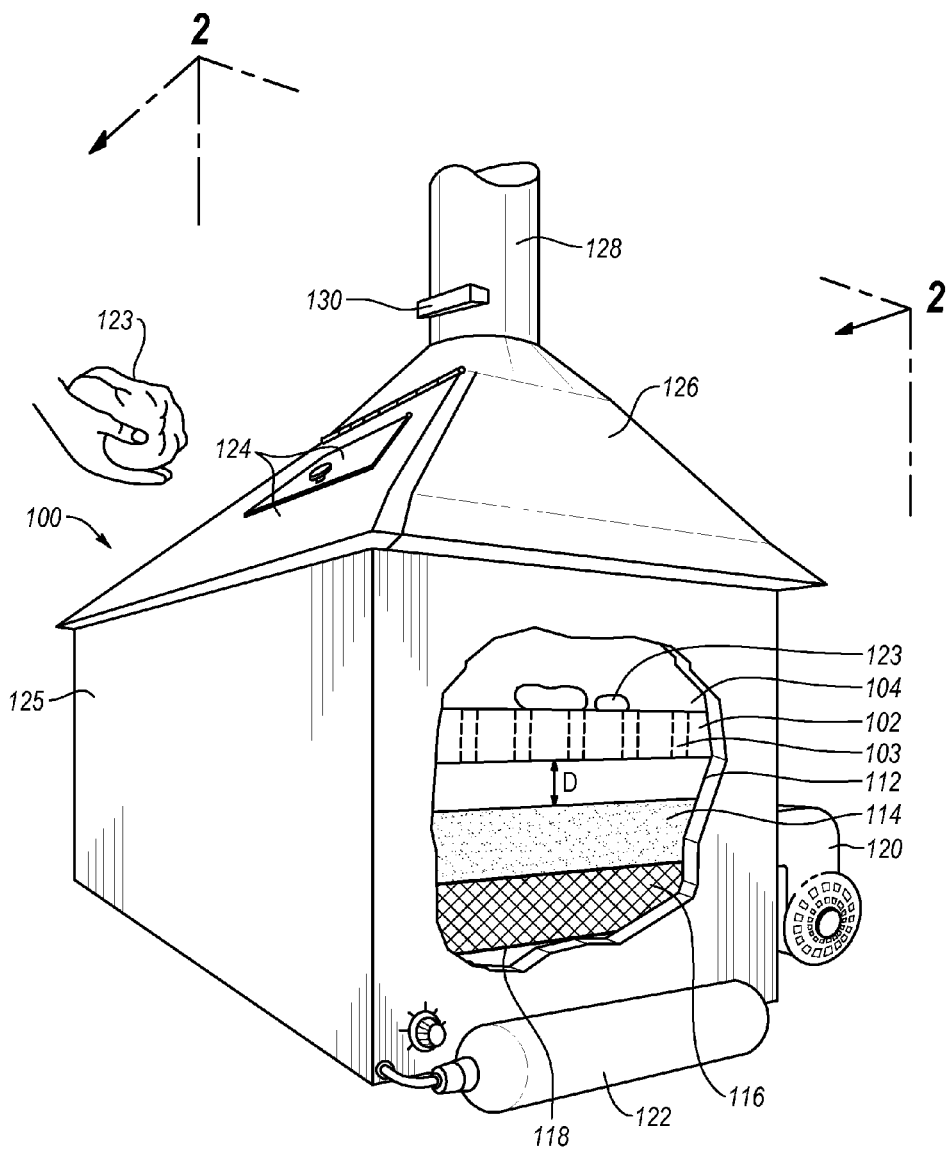
FIG. 1 is a perspective view of an embodiment of a reactor in which organic material can be efficiently converted into heat energy.

Generally, the present invention relates to improved methods and systems for conversion of organic materials, such as organic fuels and biological waste, into thermal energy which, in turn, can be used to make electrical energy. The methods and systems can be used for increasing energy production from organic fuel materials as well as for increasing the ability to disinfect and completely destroy organic waste materials, particularly biological and medical wastes such as corpses. The present invention utilizes the ability of a catalytic media, such as silica or alumina, to generate highly reactive hydroxyl radicals, supercritical water, muons and other reactive species in the presence of an organic fuel heated to efficiently transform the fuel into heat energy. Such conversion may be carried out in a single reaction chamber or multiple reaction chambers, at a relatively constant temperature range, and in a one-step process. This allows for the efficient conversion of organic materials into heat energy without the attendant problems of high temperature formation of $NO_x$ and $SO_x$ typically produced during high temperature combustion of organic materials.

The terms "activate" and "activated" are meant to refer a condition in which the catalytic media (e.g., silica and/or alumina particles) are able to produce a "reactive atmosphere" of hydroxyl radicals and other reactive species capable of degrading and extracting heat energy from organic material, such as a carbon-containing fuel or biological waste.

The terms "biological waste," "medical waste," "animal tissue," or "human tissue" are meant to refer any biological, microbe, animal or human tissue or cells, or biological components thereof. Such materials typically comprise protein, fat, blood, and bone mass. Because blood is most water, biological waste is difficult to burn using conventional combustion methods.

The term "reactive atmosphere" is meant to refer to the condition within the reaction chamber, and possibly surrounding areas and conduits, that include a localized concentration of highly reactive hydroxyl radicals, supercritical water, muons and/or other reactive molecular fragments, free radicals or species capable of degrading or otherwise reacting with organic materials to efficiently convert them into heat energy.

The terms "carbon-containing fuel," "organic fuel material," or "biological materials" are meant to refer to any organic material that generate and/or release energy when combusted or burned, usually in the form of heat, light or a combination thereof. The term "fossil fuel" is a subset of "carbon-containing fuel" and includes coal, oil, natural gas, derivatives of coal, natural gas and oil, and the like. Non-fossil organic fuels include alcohols, fuels derived from alcohols or other fermentation products, wood, biomass and the like.

The term "reaction chamber" shall be broadly construed to include any apparatus capable of holding therein a catalytic media, such as silica and/or alumina, and that provides appropriate conditions that result in formation of the reactive atmosphere for degrading and converting organic materials into heat energy.

The terms "degrade" or "degradation" refer to processes by which organic materials or incomplete combustion products such as soot, hydrocarbons, CO, tissues, cells, biological fluids, and oily substances are at least partially broken down or eliminated to yield lesser organic substances. It includes complete combustion of gases into carbon dioxide, water and other clean reaction products. It also includes any reaction in which CO, $CO_2$, carbon or hydrocarbons are converted into other, less polluting forms of carbon or other substances. Degradation of some biological materials, such as biological tissue, can generate a small amount of ash, which can be collected for sentimental reasons or appropriately discarded.

The term "suspended" is meant to indicate that at least a portion of the catalytic particles are slightly elevated and/or separated by rising gases such that they are not at rest in a state of natural particle packing density. Suspending the particles leaves them in a less compacted state. This suspended or separated elevated state yields particles with surfaces that are more accessible and available for contact with the diffused heated gases rising through the particles within the reaction chamber. Increased surface contact with diffused heated gases is believed to increase the ability of the catalytic particles to generate the reactive degrading atmosphere. Failure to partially separate the particles results in less efficient and uniform conversion of organic material into heat energy.

The term "operating temperature" is meant to refer to the temperature at which hydroxyl radicals, supercritical water, muons and/or other free radicals or reactive substances, molecular fragments or reactive species capable of degrading and converting organic materials into heat energy are generated by a catalytic media such as silica and/or alumina.

The term "portable" is meant to refer to the ability of the devices and systems used to carry out the methods of the present invention, as embodied in certain embodiments, to be capable of being moved throughout a building or medical or research facility or industrial site or energy plant or wherever needed. This movement of the device or system might be by simply carrying, wheeling by means of a supporting stand equipped with rollers or wheels, or moving by means of moving equipment (e.g., a forklift or small crane), the important feature being that a portable device or system is not primarily a fixture as the term is commonly understood.

II. Device and System

A. Example Operating Parameters

The inventive system was tested using cow leg bones, pork hearts, and neck bones with meat, as well as toxic PVC plastic pipes (e.g., 4 feet of 2 inch PVC pipe) which normally produce deadly fumes when heated or burned. Coal of various forms was also converted into thermal energy using the disclosed apparatus and methods. The inventive reactor reduced the PVC to three ounces of white and black particles with zero odors within 30 minutes. Another test was performed using 30 lbs. of 3×2 inch cow leg bones with a weight loose of 80%. One previously reacted bone dropped accidentally from a work table and crumbled. These tests have been repeated with similar results each time.

The emission tests recorded a $CO_2$ (carbon dioxide) reading of initially 4%. Emissions were gradually reduced to zero by the end of the test run. The initial HC (hydrocarbon) and CO (carbon monoxide) emissions of 40 ppm were reduced to 4 ppm (parts per million). By comparison, combustion of diesel oil normally yields 4000 ppm of CO and 15% $CO_2$. The 80-90% reduction in weight with extremely low emissions provides evidence that the biomass was efficiently used as fuel.

According to one embodiment, the inventive process uses natural gas to reach an initial temperature of 540° C. and air injected into the reactor to start reactions involving the biomass and/or organic waste and the reactive media particles in the reaction chamber. Natural gas flow is cut off when a temperature of 540° C. is reached but heat production continues with the biomass or reactive organic waste producing increased temperature without producing a flame. The continuing reactions transform the waste into thermal energy and reduce bone weight by 80% to 90% and the PVC plastic weight is reduced by over 95%. 50 pages of paper were also combusted and their weight was reduced by over 85%. The paper showed no signs of actually burning and produced no emissions and the print remained visible but when touched the paper broke like snowflakes.

The initial Maganas Plasma Process™ was pioneered by Thomas C. Maganas and Allen Harrington, and a nano molecule that formed a monomolecular film discovered in Chemical Vapor Deposition (CVD) led to the discovery of a diesel catalytic converter. The monomolecular nano film includes elongated dwarf shaped carbon molecules with a precise size, and shape which was 30 Å (angstroms) by 50 Å. Increased pressure increased its size to 70 Å with resistance to cracking, while other nanomolecules crack merely by a touch. Maganas and Harrington filled a U.S. patent in 1991 and won a patent in 1992 for the film. Johannes Gutenberg University in Mainz, Germany claimed discovery and identified the identical Maganas monomolecular nano film with their advanced electron microscope that matched our nanomaterial as to size, shape, and its resistance to 400,000 atmospheres of pressure before cracking. Their photos fully matched our nanomaterial that formed the monomolecular film, which is an important aspect in reduction of diesel emissions and organic waste and reduce emissions by 99.995%. Maganas has been awarded 12 patents by the United States Patent Office and has other patents pending. We have additional foreign patents, and have invested several millions of dollars into the Research and Development of these new technologies prompted by the Maganas and Harrington discovery of —OH radicals and the nano formation of monomolecular film.

A fully developed and functional prototype system is now operating at the Maganas Laboratories. Located in Carson, Calif., this first generation system was developed to serve as the functional proof of concept of the technology exhibiting the following highlights:

1. Conversion of low energy grade cow bones, soft body tissue, plastics, and many other forms of organic matter into sustained temperatures of 420° C.-600° C. without flames with about 5% of the fuel that normally would be required;
2. Demonstrated ability to convert paper and PVC plastic into sustained temperatures of 500° C.-700° C. in the absence of combustion and with a 90% reduction of mass weight and 99.995% emission reduction with zero odors throughout the test during transformation, and the particles that is left over on completion.

The Maganas Plasma Process™ is based upon inducing plasma to form and to allow hydroxyl radical reactions in a reactor coated with a monomolecular film with an open top that allows atmosphere penetration without affecting the process.

Tom Maganas process of eliminating diesel engine emissions with a hydrocarbon diesel catalytic converter that eliminates 99.995% of all emissions from diesel engines with a ⅔ reduction in fuel consumption and an increase of power. The two key elements of the Maganas catalytic converter is hydroxyl radicals, and the monomolecular nano film, which together produce reactions to crack 17 inorganic elements found in diesel fuel that equaled 1,451 ppm (parts per million), and also reduced sulfur to a sulfate ash element that could not be weighed by the analyzing scientist. This also permanently deposited the monomolecular nano film onto the interior surface of the reactor. Diesel fuel being injected into compression with —OH radicals and monomolecular nano film reactions that crack 1,451 ppm of the inorganic elements from diesel to form a fuel to increase power and decrease fuel consumption by ⅔ occur by breaking the carbon chains and releasing supercritical water as a gas by separating inorganic elements. One would have to conclude that the standard ⅔ drop in fuel emissions means they are consumed as fuel and match Maganas Plasma transformation organic of medical waste.

B. Example Structures and Methods

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. The features of the embodiments and figures described and shown herein can be used and combined with other features of other embodiments as well as figures. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In one embodiment, FIG. 1 illustrates an embodiment of a reactor 100 that can be used for destruction and efficient conversion of organic substances 123 into heat energy. For example, the reactor 100 can be used for enhancing the combustion or conversion of organic fuel materials into heat energy as well as destroying biological waste, tissues, or corpses and other organic substances. In yet another example, the reactor 100 can be used for efficient energy production by catalytic degradation and conversion of various organic substances, such as organic fuels and biological waste.

The reactor 100 can include a reaction chamber 112 containing a heat generation source 122 (e.g., a gas flame or electrical heating element), an air flow source 120, a base support 118, an airflow diffuser 116, a catalytic media 114, and a support element 102 configured for supporting an organic material 123 at a distance (D) above the catalytic media 114. The support element 102 includes a support surface with one or more apertures 103 so that gases can pass therethrough and deliver reactive species produced by the catalytic media to the organic material 123. The reaction chamber 112 can include a void space 104 between the support element 102 and a top filter 130 and/or an exhaust conduit 128. The depth of catalytic media 114 need only be sufficient to produce a reactive atmosphere of reactive hydroxyl radicals or other reactive species and can be as little as 1 inch and as high as 1 foot, with about 2-7 inches being preferred, and about 2-5 inches being most preferred.

The positioning of the support element 102 above the catalytic media 114 at a distance D allows for the reaction chamber 112 to be capable of facilitating substantially complete degradation and conversion of organic materials (e.g., organic fuels and biological waste) into heat energy. Additionally, the support element 112 keeps the organic material 123 from falling into the catalytic media 114. The reaction chamber 112 is generally enclosed or sealed except for where air is introduced into the bottom of the reaction chamber 112 to suspend or separate the media 114. Additionally, the reaction chamber 112 can include an inlet 124 so that the organic material 123, alone or contained by the support element 102, can be introduced into the reaction chamber 112. Also, the reaction chamber 112 includes the exhaust conduit 128 so that resulting gases and/or heat can be removed.

The catalytic media 114 can include sand-like particles of a material such as silica sand, silica gel, hydroxylbastnasite, alumina, other —OH radical generating materials known in the art or which may be developed, and the like. Silica sand, silica gel, alumina, and mixtures thereof are preferred media because of their low cost and exceptional performance in the reaction chamber 112. The catalytic particles can have an average size (e.g., diameter or cross-sectional dimension) ranging from about 0.1 mm to about 1 cm, more preferably from about 0.2 mm to about 5 mm, and most preferably from about 0.5 mm to about 2.5 mm.

The catalytic media 114 can consist essentially of silica, alumina, or mixtures thereof. The term "consist essentially of" should be understood to mean that the catalytic media 114 can be particles that mainly consist of silica, alumina or mixtures thereof, but they may include minor quantities of impurities such as metals and ash typically found in silica and/or alumina. It is believed that the silica and/or alumina, when properly activated in the presence of sufficient heat and moisture, produce a localized reactive atmosphere of highly reactive hydroxyl radicals, muons and/or other reactive species or molecular fragments, which are able to degrade and convert organic materials into heat energy.

Moreover, whereas the silica and/or alumina are believed to be responsible for the formation of a reactive atmosphere that includes abundant hydroxyl radicals such that expensive catalysts such as palladium and platinum are not necessary, inclusion of such materials in minor amounts would be within the scope of the present invention so long as the silica and/or alumina are activated and able to produce the reactive atmosphere.

It may be advantageous to select catalytic particles that have a relatively high specific surface area. The high specific surface area can be achieved by particle size distribution as well as porosity of the particles. It is believed that it is at the surface of the catalytic particles where the reactive hydroxyl radicals or other reactive species or molecular fragments are generated. Accordingly, increasing the surface area of the catalytic particles without increasing their weight allows for the use of a lower mass of particles while maintaining a desired level of reactivity with the organic material. Reduced weight is particularly desirable in the present embodiment, since the reaction chamber 112 can be configured to be portable. The amount of particles needed may be significantly reduced when the grain size is reduced and/or the surface of the particles is made to be more irregular, both of which tend to increase the specific surface area of the catalytic particles.

The catalytic media 114 is shown to be positioned above an air diffuser 116 which sits upon a base support 118. Optionally, the air diffuser 116 and base support 118 can be combined into a single element that function to both 1) support the catalytic media at a desired location within the reaction chamber 112 and 2) diffuse air passed through the reaction chamber 112 so that the airflow is sufficiently diffuse to substantially uniformly suspend or separate the catalytic media 114.

In one example, the air diffuser 116 can be a bed of pebbles, rock or particles that are substantially larger than the catalytic media 114. The airflow rates for suspending the catalytic media will generally depend on the size of the reaction chamber and/or the quantity of organic material being converted. According to one embodiment, the airflow rate can range from about 1 ft$^3$/min to about 500 ft$^3$/min, more preferably from about 5 ft$^3$/min to about 250 ft$^3$/min, and most preferably from about 10 ft$^3$/min to about 100 ft$^3$/min.

The air diffuser 116 can be configured to efficiently transfer heat with respect to the airflow throughout the catalytic media 114 and reaction chamber 112. When the air diffuser 116 includes rocks, they can sit atop a support plate that functions as the base support 118. On the other hand, the air diffuser 116 can be a support plate that has a sufficient amount and distribution of apertures that diffuse the air passed therethrough. The air source 120 can be oriented with respect to the air diffuser 116 and/or base support so that air introduced through the air diffuser 116 can travel upward through the catalytic media 114 and not downward and away from the catalytic media 114. The base support 118 (e.g., support plate) can include a heat conductive material (e.g., metal) for effective heat transfer when heat is used to regulate the temperature of the reaction chamber 112.

An air source 120 blows forced air through the catalytic media 114 to a partially suspend and/or churn the catalytic media 114. An example of an air source 120 can include air jets from an air compressor. The air jets can be located below or within the air diffuser 116 to facilitate a more disperse airflow through the catalytic media 114. However, the air jets can be situated directly within the catalytic media 114, typically in embodiments where an air diffuser 116 is not employed. Also, the air jets can be located below a base support 118 that has apertures that can diffuse the airflow.

The air that is introduced into the reaction chamber 112 by the air source 120 can be heated to a desirable temperature. For example, the airflow from air jets may be preheated to approximately the desired temperature of the reaction chamber 112, or it may become heated by means of heat that radiates through the base support 118 and/or air diffuser 116. Also, a heat generation source 122 can be provided in an orientation that provides a flame or electrical heating element as a means for heating the base support 118 and/or air diffuser 116. The heat generation source 122 may include one or more burners that burn a carbon fuel source. Also, the heat generation source 122 can be an electric resistive heater or any other device that can transfer heat to the base support 118, air diffuser 116, catalytic media 114, or airflow from the air source 120.

In the instance where heated air is introduced into the reaction chamber 112 (e.g., by air jets), the air may be preheated by a number of means, including electric heating means or radiant heating means heated by a fuel such as natural gas, fuel oil, or coal, where it is desired to pass pure air through the reaction chamber 112. However, it may be more economical to simply introduce and burn natural gas within the reaction chamber 112 (e.g., within the catalytic media 114). Because natural gas produces mainly water and carbon dioxide, it should not inhibit the reaction process within the reaction chamber 112. Generation of water vapor from natural gas may enhance the reactivity of the catalytic media 114 through production of hydroxyl radicals. Other combustion gases besides natural gas can be used. Because the combustion gases are preferably blended with introduced airflow in order to provide the proper temperature conditions, the air that is introduced into the reaction chamber 112 can include adequate oxygen in most cases. However, it is possible to enrich the air with pure oxygen if desired to increase the reactivity within the reaction chamber 112.

The airflow through the catalytic media 114 should have sufficient velocity and pressure to cause the catalytic media 114 to become partially suspended. In order to obtain the best and most efficient conversion of organic materials, it may be preferable to blow just enough air to cause adequate suspension of the media so that the support element 102 holding an organic material 123 remains a distance (D) over the catalytic media 114 when suspended. Alternatively, the support element 102 can be adjusted a distance (D) from the top of the catalytic media 114 within the void space 104 in order to effect optimal conversion of the organic material 123. However, it should be considered that the less air that actually passes through the reaction chamber 112, while maintaining adequate suspension, will use less energy and produce a lower quantity of resulting gases that are vented from the reaction chamber 112.

The reactor 100 can be equipped with means for introducing biological materials 123 into the reaction chamber 112, where the biological materials 123 can be packaged or loose on the support element 102. The biological materials 123 can be introduced into the reaction chamber 112 while on the support element 102, or they can be placed onto a support element 102 already installed in the reaction chamber 112. Such a means can include an entrance 124 such as doors, ports, continuous inlets, or any other configuration that allows the biological materials 102, such as solids or liquids, to be passed into the reaction chamber 112 to reside on the support element 102 during conversion. The entrance 124 can be configured to be capable of quickly opening to receive the biological material 123, and then closing in order to retain the heat within the reaction chamber 112. In an alternative embodiment, the entrance 124 may include a set of double doors to better retain heat within the reaction chamber 112, with a first door opening to allow the introduction of the organic material within a pre-chamber (not shown), after which a second door opens up into the main reaction chamber 112.

In some instances, such as where very large pieces of biological material (e.g., corpses) are introduced into the reaction chamber 112, it might be preferable to open the reaction chamber 112 through a lid 126 covering the top of the reaction chamber 112. The lid 126 can be removed from the main body 125 of the reaction chamber 112. In that case, it may be necessary to restore the temperature within the reaction chamber 112 by temporarily increasing the temperature of the air that is introduced into the reaction chamber and/or increasing the heat produced by heat generation source 122.

The reactor 100 can include an exhaust conduit 128 positioned above the reaction chamber 112 so that produced gases can be released. Optionally, the exhaust conduit 128 can be located near the entrance 124 and/or the lid 126 at the top of the reaction chamber 112, which carries the gases to an appropriate location for emission into the outside air. Heat within the waste gases can also be recycled back into the reaction chamber 112 by any appropriate method known to those of ordinary skill in the art, such as by heat exchange, to heat up the air introduced into the reaction chamber 112, or by simply recirculating the gases back into the reaction chamber 112 to ensure complete and efficient breakdown of essentially all organic materials 123 and gases. This may be one means of ensuring the complete conversion and/or destruction of any biological materials, such as viruses or pathogenic agents. Organic materials 123, such as carbon fuels, medical waste, viruses, bacteria, and the like, all are converted to a new fuel resulting in complete combusting and destruction of all organic matter, viruses, and bacteria.

In one embodiment, a method for efficiently converting organic materials into heat energy can be performed with the reactor 100. The conversion method can be performed in a manner for enhancing energy production from carbon fuels, as well as for destroying both biological waste and animal or human corpses. According to one embodiment, the temperature within reaction chamber 112 can be maintained in a range from about 350° C. to about 600° C., more preferably at about 550° C. This temperature can be obtained at in the void space 104, such as at the support element 102 at a distance (D) above the catalytic media 114. This temperature can be initially achieved by the heat generation source 120 and/or air source 122. The heat generation source 120 can be extinguished and/or reduced in heat production once the organic material 123 begins to convert and produce heat energy, and the air source 122 flow rate can be adjusted so that the conversion of the organic material 123 to heat energy is maintained. The conversion of the organic material 123 can be maintained even when the heat generation source 120 is deactivated. In part, it is thought that the conversion of the organic material 123 can be maintained from the reactive species generated by the catalytic material 114. Below a given conversion temperature, the conversion reaction may be inhibited. Above a given conversion temperature, excess heat may be unnecessary and, therefore, inefficient.

The inventor has found that organic materials 123, such as carbon fuels, medical wastes, corpses, and other organic wastes, are efficiently converted by means of reactive species produced by the catalytic media 114, which include reactive hydroxyl radicals, hydrogen oxides, muons, or other highly oxidative species. Because of the oxidative nature of the process for converting organic materials into heat energy, it may be preferable to ensure that there is abundant oxygen within the air being introduced into the reaction chamber 112.

In one embodiment, biological materials may be encapsulated within any appropriate encapsulation material capable of being converted in the same manner as the biological material within the reaction chamber 112. For example, biological fluids and/or tissues can be retained within a combustible package. The combustible encapsulation material can include paper, thin plastic bags, and the like.

In some cases it might be desirable to adjust the composition of the atmosphere within the reaction chamber 112. For example, it may be desirable to increase the amount of oxygen within the reaction chamber 112 by intermittently injecting oxygen in order to facilitate oxidation of a particular biological material. Most biological waste naturally contain water, which can yield additional hydroxyl radicals during the process. Supplemental gas may be introduced together with the air by means of the air source 120 or other gaseous inlet.

Figure 2:
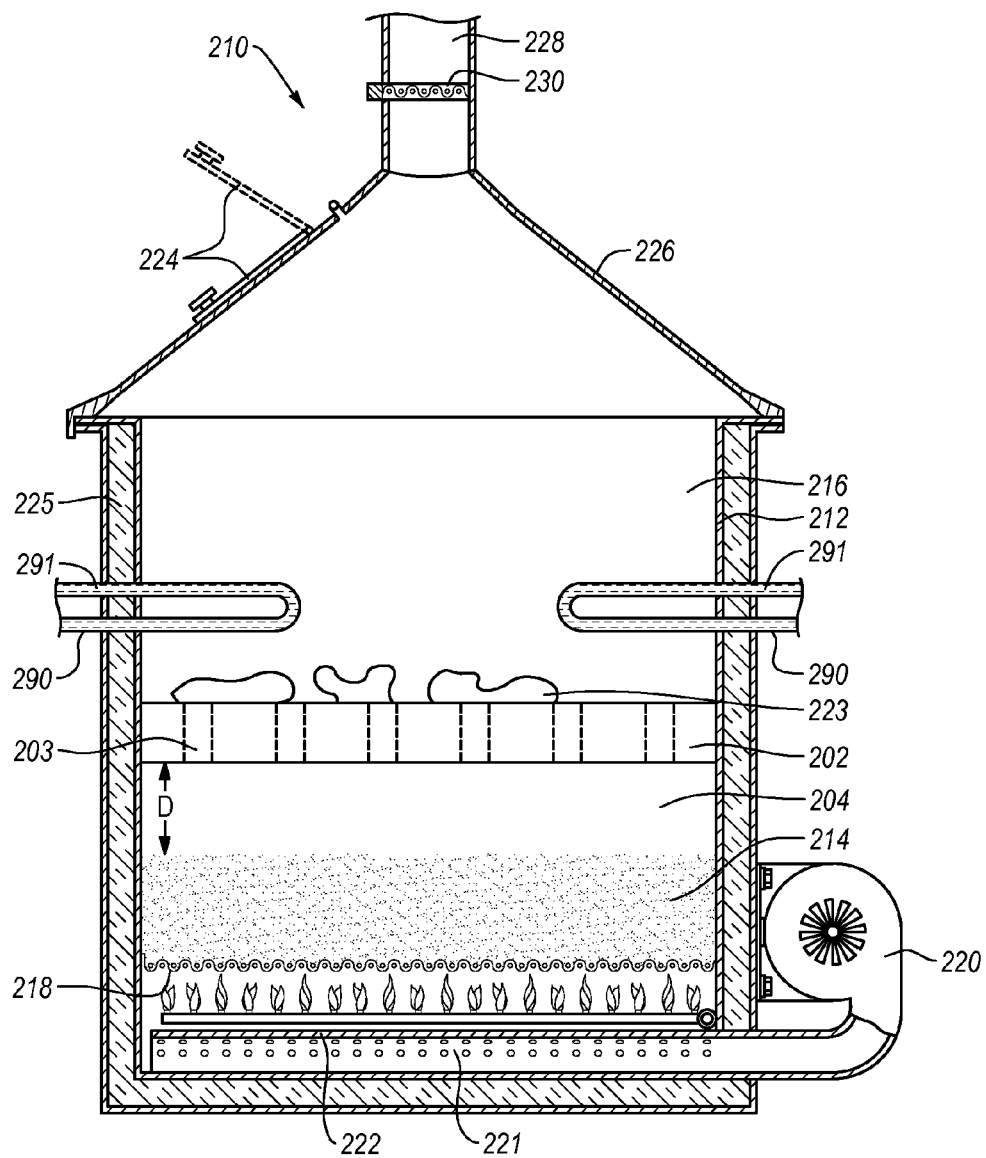
FIG. 2 is a cross-sectional view of an embodiment of a reactor equipped with heat exchangers.

FIG. 2 illustrates another embodiment of a reactor 200 that can be used for converting organic substances 223 into heat energy. The reactor 200 can include a reaction chamber 212 containing a heat generation source 222, an air source 220 with an air inlet 221, a base support 218 configured to diffuse airflow, a catalytic media 214, and an support element 202 configured to hold an organic material 223 at a distance (D) above the catalytic media 214 when suspended. The support element 202 includes one or more apertures 203 so that gases can pass therethrough and deliver reactive species to convert the organic material 223.

Suspension of catalytic media 214 within the reaction chamber 212 maintains a void space 204 between the catalytic media 214 particles and the support element 202. The support element 202 is configured to retain the organic material 223 above the catalytic media 214 through the various stages of conversion.

The reaction chamber 212 can include an inlet 224 so that the organic material 223, alone or contained by the support element 202, can be introduced into the reaction chamber 212. The reaction chamber 212 can be configured with a lid 226 that can be entirely removed for loading large organic materials 223 as well as the support element 202 into the reaction chamber 212.

Also, the reaction chamber 212 includes an exhaust conduit 228 so that gases produced by conversion of the organic materials 223 can be removed. The exhaust conduit 228 can include a capturing element 230 that prevents escape of supercritical water from the reaction chamber. The reaction zone 216 can be located at or above the support element 202 up to the capturing element 230.

The embodiment of the reactor bed device of FIG. 2 can be beneficial because the air can be blown into the reaction chamber 212 below the heat generation source 222 so that the air blown into the reaction chamber 212 by the air source 220 through the air inlet 221 blows past the heat source 222 so as to heat the airflow. The flame source 222 can also heat the base support 218, which can in turn heat the airflow.

In one embodiment, the reaction chamber 212 can be operatively coupled with an energy generator (not shown) such that the conversion of the organic material 223 provides heat for energy production. The energy generator may include a heat exchanger 290 that can be partially located within the reaction chamber 212. More particularly, the heat exchanger 290 can be located within the reaction zone 216 so that heat from conversion of organic material can heat a heat exchanger fluid 291. The heated heat exchanger fluid 291 can then be used to convert heat energy to electrical energy as is well known, such as through steam generators. The number, orientation, location, or other parameter of the heat exchanger 290 can be modulated so that any number can be used and so that the location of the heat exchanger 290 is optimum for heat exchange.

Figure 3:
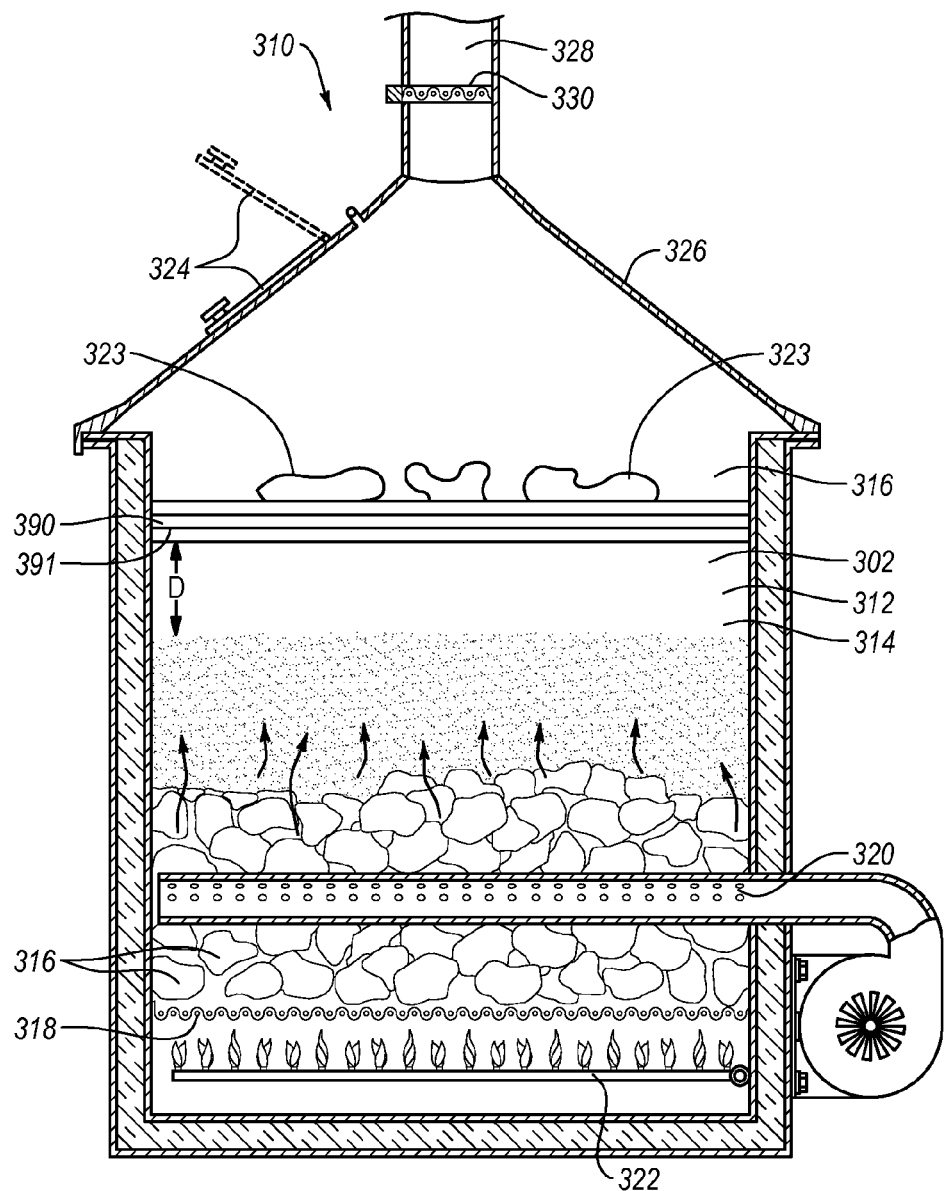
FIG. 3 is a cross-sectional view of an embodiment of a reactor for efficiently converting organic material into heat energy.

FIG. 3 illustrates another embodiment of a reactor 300 that can be used for conversion of organic materials 323 into heat energy. The reactor 300 can include a reaction chamber 312 containing a heat generation source 322 positioned below a base support 318 holding an airflow diffuser 316, such that the heat generation source 322 can heat the base support 318 and airflow diffuser 316. An air source 320 with an air inlet 321 can be located within the airflow diffuser 316 so that the air blown into the reaction chamber 312 can be heated and diffused. A catalytic media 314 is located on or above the airflow diffuser 316 so that the diffused airflow can suspend the catalytic media 314. An support element 302 configured for holding an organic material 323 is positioned within the reaction chamber 312 at a distance (D) over the catalytic media 314 when suspended. The support element 302 includes one or more apertures (not shown) that permit reactive gases to pass therethrough and deliver reactive species to convert the organic material 323. The support element 302 is configured to include a heat exchanger component 390 so that a heat exchanger fluid 391 can pass through the support element 302. Sufficient heat is generated from reacting and converting organic material 323 so that the heat exchanger component 390 is sufficiently heated from the organic material 323.

The reactor 300 can also include an inlet 324 so that the organic material 323 can be introduced into the reaction chamber 312 and placed on the support element 302. Also, the reaction chamber 312 can be configured with a lid 326 that can be entirely removed for loading large quantities of organic materials 323 as well as the support element 302 into the reaction chamber 312.

Also, the reaction chamber 312 includes an exhaust conduit 328 so that exhaust gases containing reaction products and/or heat can be removed. The exhaust conduit 328 can include a filter 330 so that particulates, such as reaction product particulates, do not pass through the exhaust conduit 328, but may be retained within the reaction chamber 312 so that such particulates fully combust within a reaction zone 316 and heat the heat exchanger component 390. The reaction zone 316 can be located at or around the support element 302.

Figure 4A:
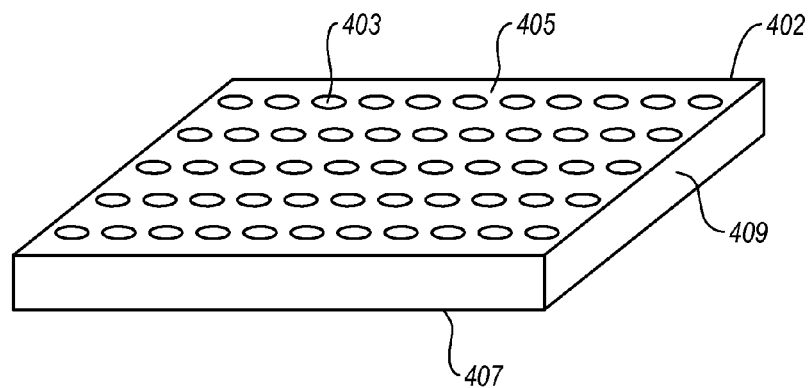
FIGS. 4A-4D include various view of different embodiments of support elements that can hold and retain organic material above a catalytic media during conversion of the organic material to heat energy within a reactor.

FIGS. 4A-4D illustrate various embodiments of an support element 402 that can hold an organic material for conversion within a reaction chamber. As shown in FIG. 4A, the support element 402 can be configured as a substrate that includes one or more apertures 403 that extend from a top surface 405 to a bottom surface so as to allow for reactive gases to pass therethrough and convert the organic material located on the top surface 405.

Figure 4B:
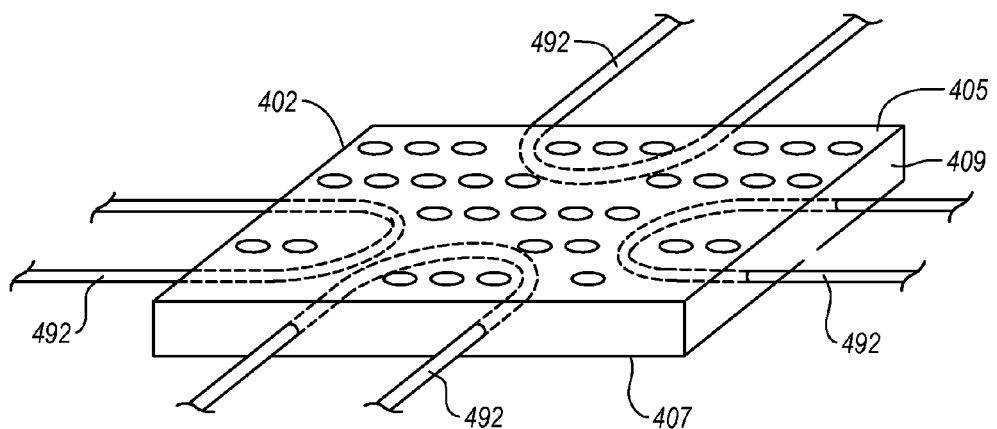
Figure 4C:
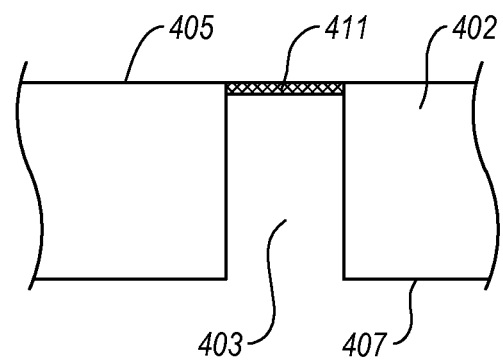

FIG. 4B includes a support element 402 that is similar to one shown in FIG. 1A, except that the support element 402 includes one or more heat exchanger conduits 492. The apertures 403 (shown up close in FIG. 4C to include fluid permeable member 411) are distributed around the heat exchanger conduits 492 so as to not intersect therewith. As such, the apertures 403 and heat exchanger conduits 492 are mutually exclusive of each other and not fluidly coupled.

Figure 4D:
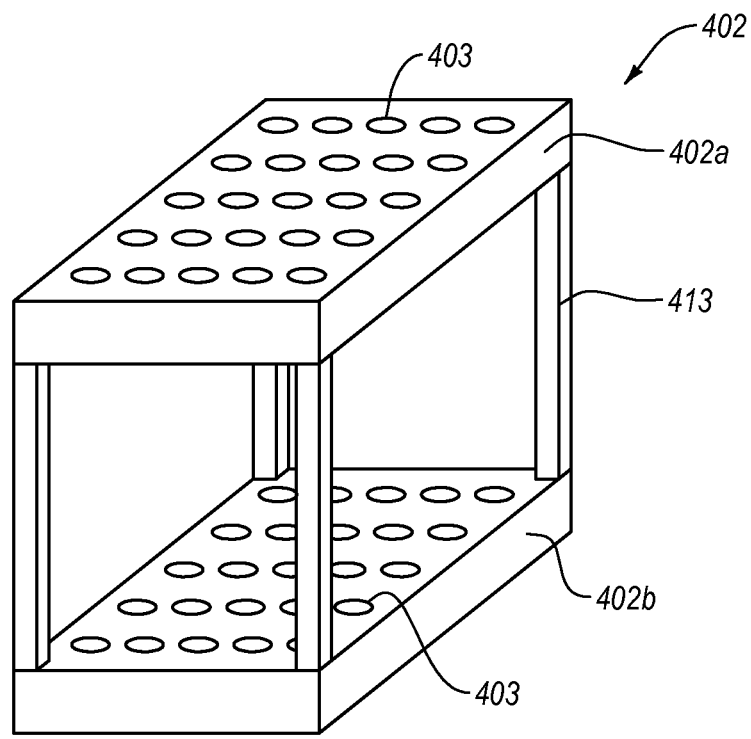

FIG. 4D shows a support element 402 that has two or more elevated support substrates 402a and 402b. Each elevated support substrate 402a and 402b can be configured as any support element 402 described herein. As shown, one or more support members 413 are used to couple the two or more elevated support substrates 402a,b together so that the top elevated support substrate 402a is located above the bottom elevated support substrate 402b while being retained within a reaction zone. Alternatively, the two or more elevated support substrates 402a,b can be independently coupled with an inside wall of a reaction chamber so that support members 413 are not required. When multiple elevated support substrates 402a,b are included and mounted within a reaction chamber, one or more doors or access ports can be included between the elevated support substrates for access to the support substrates 402a,b, especially lower support substrates 402b.

In one embodiment, the support element can be a distance of from about 1 inch to about 24 inches above the catalytic media when suspended, or from about 2 inches to about 12 inches, or from about 3 inches to about 8 inches, or from about 4 inches to about 5 inches. Also, these distances can be the distance from the organic material on a top surface of the support element from the suspended catalytic media. Additionally, these distances can be from a bottom elevated support in a multi-elevated support embodiment. Particular examples of the distance the elevated support and/or organic material can be from 2-3 inches, more preferably from 4-5 inches, even more preferably from about 5-8 inches, and most preferably from 9-12 inches. Previously, it was thought that an organic material would have to be in physical contact with and submerged within the volume of catalytic particles in order to effect conversion or reaction of the organic materials from reactive species generated by the catalytic media. However, it has now been unexpectedly and unpredictably found that an elevated support element can be used to retain the organic material above or outside the catalytic media so that the particles of the catalytic media do not actually contact the organic material or its reaction products. Thus, now it is unexpectedly found that reactive species can be generated from the catalytic media, which then travel up to facilitate conversion of the organic material above or outside the volume of catalytic media.

While the reactors described herein can be scaled up or down depending on industrial or bench-top settings, the reaction chamber can be exemplified by a cross-sectional dimension of from about 1 foot to 10 feet, or from about 1.5 feet to about 8 feet, or from about 2 feet to about 6 feet, or from about 2.5 feet to about 5 feet, or from about 3 feet to about 4 feet. The corresponding void space or reaction chamber height for one of these cross-sectional dimensions can range from about 3 feet to about 15 feet, or from about 3.25 feet to about 10 feet, or from about 3.5 feet to about 8 feet, or from about 4 feet to about 6 feet, or about 5 feet. The reaction zone within the reaction chamber can be at or above the support element or the surface containing an organic material. When multiple elevated supports are included, there may be multiple reaction zones. The height of the reaction zone can be less than about 24 inches above the elevated support, or less than about 12 inches, or less than about 8 inches, or less than about 5 inches. Particular examples of the height of the reaction zone can be about 2-3 inches around the organic material, more preferably from 4-5 inches, even more preferably from about 5-8 inches, and most preferably from 9-12 inches around the organic material. It will be appreciated that these dimensions are exemplary for a bend scale model and would certain increase when scaling up the unit (e.g. so as to have 2 to 500 times the capacity of the bend scale version).

In a one embodiment, the catalytic media particles are suspended in a fairly static condition against the force of gravity by means of air flowing upwards through the particles so that the support element within the reaction chamber retains the organic material at a distance (D) above the catalytic particles. Such airflow can be provided by any gas pressurizing means known in the art, including turbines, fans, pumps, or the like. Suspending the catalytic particles greatly increases the active surface area of the silica and/or alumina particles by separating them slightly and allowing for more gas-to-particle contact for producing the reactive species that travel up to interact and convert the organic material.

The conversion of the organic material provides heat to the reaction chamber within the reaction zone such that the temperature can be maintained or even increased once gas supply to a flame source is reduced or stopped. The conversion of organic material can heat the catalytic media, void space of the reaction chamber, and the reaction zone. The temperature obtained from conversion of the organic material can increase up to about 900° C., or up to about 750° C., or up to about 600° C., or be maintained between about 400° C. to about 550° C. Higher temperatures are likely to be capable of being achieved. These temperatures can be obtained with biological materials, coal, charcoal or other fuels as the organic material. However, other carbon fuel sources may be capable of producing even more heat and higher temperatures.

Because the catalytic media is a source for reactive species that are generated from the interaction of the catalytic particles, oxygen, and the organic material, the catalytic media might be expected to break down over time, or become depleted as organic materials are converted into thermal energy. In fact, it appears that a measurable fraction of the catalytic media is broken down over time, although the amount is extremely small in comparison to the molar equivalents of organic material being converted or consumed. An advantage of the present invention is the exploitation of the highly reactive nature of the reactive species produced from the catalytic media, oxygen and the new fuel from the organic matter instead of the enormous amounts of energy that are expended in producing a sufficiently hot incinerator to combust organic materials and/or destroy the medical wastes by burning. This advantage is particularly apparent in light of the extremely low cost of catalytic media such as silica or alumina, which are readily available, largely inert until exposed to the reactive conditions, and very inexpensive.

Because of the nature of the conversion process, it is possible to greatly upscale or downscale the reactor size to accommodate a variety of uses. The reaction apparatus and chamber may be very large in order to serve large institutional needs such as a huge medical or research complex as well as industrial energy production. Conversely, it may be very small and portable when only required to destroy a small but steady stream of medical wastes or for local or personal energy production. The latter also provides for ease in moving and placement of the reactor in the most convenient location.

Clean Energy Production

In one embodiment, the present invention includes methods for implementing the reactor for efficiently and cleanly converting carbon-containing fuels such as fossil fuels into heat energy. However, other organic materials, such as biological wastes and municipal waste, can also be used for clean and efficient energy production with reactors as described herein. The reactor can utilize catalytically reactive particles that are at least partially suspended by moving gases within the reaction chamber, and can be maintained at a temperature sufficient to cause the suspended media particles, typically silica sand, silica gel, or alumina, to produce reactive hydroxyl radicals, supercritical water, muon methyl radicals and/or other reactive species. The reactive species travel up into the void space above the catalytic media where they interact with the organic material supported by the support element. Typically, the reaction chamber can be maintained at a temperature in a range from about 420° C. to about 550° C. Moisture may be provided by the organic mass.

Clean energy production includes means for converting energy into useable energy such as heat and/or electricity. Traditionally, energy can be used for propulsion, heat, and generation of electricity. As such, the inventive reactor can be included within any system for energy production, where the reactor provides heat or exhaust gases that can be converted by energy generation equipment into usable energy. While propulsion energy may be obtained with the reactor, it may be more suitable for generating heat and/or electricity. Accordingly, various energy generation and heat transfer equipment can be operably associated with the reactor so that the conversion of the organic material provides the fuel source for energy production. Examples of energy generation and heat transfer can include the reaction chamber and even the support element to be thermally coupled to heat exchangers, steam generators, or other well known or later developed energy devices and systems. Thus, the reactor can be substituted for conventional combustion or incineration devices so that the organic material can be more efficiently and cleanly used as fuel for energy production.

Degradation of Organic Waste

In one embodiment, the present invention includes methods for the complete and reliable destruction of biological materials such as medical wastes or once-living human or animal tissues. Such methods not only ensure the complete destruction of the actual physical or visible wastes or tissues, but also ensure the complete destruction of all viruses, bacteria, or other pathogenic agents that might be found in the medical wastes or tissues. Moreover, such destruction is carried out without the need for chemical sterilization, autoclaving at high temperature and pressure, high temperature incineration, plasma arcs, and the like. Instead, the present invention utilizes a reactor as described herein that includes a reaction chamber containing a support element configured for maintaining the biological material at a distance (D) above the catalytic media. A reactive atmosphere can be generated by catalytic particles, such as silica, alumina, and the like, when interacted with oxygen and pyrolysis products from the organic fuel. The method of destroying the biological materials can be performed as described herein by placing the biological material on an elevated support within the reaction chamber at a distance above the catalytic media so that the reaction gases can substantially completely convert or degrade the organic material and decontaminate and destroy the biological materials.

Because the biological material can be quickly and efficiently disinfected and destroyed by the reactive gases in the reaction chamber, it greatly simplifies the heretofore significant problems associated with the disposal of medical wastes. It also provides a means for the complete disposal of animal or human corpses while generating less byproduct than the amount of ash produced by traditional cremation or incineration, which requires far more energy to carry out and which is known to generate noxious or toxic gases.

In view of the foregoing, a feature of the present invention is to provide methods and systems that result in the complete and reliable destruction of medical wastes and other once-living human or animal tissue. Another feature is to provide methods and systems that result in the complete and reliable destruction of medical wastes and other once-living human or animal tissue in a simple, single step without polluting the environment. A further feature of the present invention is to provide methods and systems that ensure the complete destruction of all viruses, bacteria, or other pathogenic agents that might be found in the medical waste or corpse being disposed of. Yet another feature is to provide methods and systems which completely and thoroughly destroy the medical waste or other once-living human or animal tissue without the generation of noxious gases. Still another feature of the present invention is to provide methods and systems that completely and thoroughly destroy the medical waste or other once-living human or animal tissue at relatively low temperatures compared to conventional incineration or plasma forming methods. Finally, it is a feature of the present invention to provide a reactor for carrying out the foregoing methods that are relatively small and portable that could be stationed at a variety of locations within a hospital, research laboratory, or other sites where biological materials, medical wastes or corpses need to be destroyed without the possibility that dangerous viruses or pathogens are released into the environment, particularly at a hospital or laboratory where sterile conditions are especially vital, or through the transport of such wastes to available landfill sites.

In one embodiment, the organic waste material can be from various research, medical, or industrial applications as well as from dead animals. As such, the organic waste material can include syringes, cell culture byproducts, bacteria broth byproducts, cell culture devices contaminated with biological waste, dead tissue, dead animals, blood, body fluids, bacteria, viruses, or the like. In one aspect, the organic material can be a dead human body, and the conversion process can be used in cremation.

In one embodiment, the conversion and/or degradation of biological waste materials can be obtained by shutting of gas supply to the flame source after a reaction zone at or above an elevated support reaches a first desired temperature so that the biological waste material is sufficiently converted or degraded. Accordingly, once a desired temperature is achieved with aid of the flame source, the gas supply to the flame source can be reduced or even turned off so that conversion of the organic waste material produces, maintains, or increases the desired temperature. As such, the energy production can be conducted while maintaining airflow in the absence of the flame source producing heat such that conversion of the organic material provides heat to reach or maintain a second desired temperature. The second desired temperature can be the same or greater than the first desired temperature.

EXAMPLES

Example 1

A reactor substantially as described herein was used in experiments to convert and degrade organic materials ranging from cow bones, flesh, and PVC plastics in order to mimic other biological or medical wastes. It was found, surprisingly and unexpectedly, that the organic material does not have to physically contact the catalytic media as was previously believed. It has now been surprisingly and unexpectedly found that conversion and degradation of organic materials can be achieved by positioning the organic material above the catalytic media such that the organic material does not actually contact, and is not submerged within the volume of, the catalytic media. The organic materials in this example were not submerged into the silica bed but were rather positioned above the silica, suspended in a metal cage container. The conversion reaction with the biological material appears to occur in about a 2-36 inch zone above the silica bed. The conversion reaction not only broke down the organic matter, it also converted the low energy grade materials (e.g., bones, plastic and biological waste materials) into a substantially higher amount of energy than would be expected by mere incineration as found by observing temperature increases in the reaction zone and void space above the catalytic media.

The conversion and energy production from biological waste materials were conducted by introducing about 5 lbs of organic matter (e.g., bones, flesh, and/or plastics) into a permeable container and then lowering the container into the reaction chamber, with a lid placed over the top of the reactor. Prior to placing the organic material into the reaction chamber, air was injected from the bottom, which passes through the silica, suspending the media. Natural gas was injected into the silica media and ignited. The natural gas was used to heat the chamber to a temperature of 540° C. That temperature was reached in approximately 20 seconds then the system automatically turned off the supply of gas. Airflow was continuously injected into the reaction chamber as a continuous flow of ambient temperature air through the system.

At this point, the organic material was introduced into the chamber via a container cage (e.g., support element) which was lowered into the chamber and a lid was placed on top. The temperature of the reaction chamber, as measured inside the silica bed, continued to climb to approximately 870° C. as a result of the plasma reaction. In general, the temperature can stay between 540° C. and 920° C. for up to 40 minutes after the gas to the flame source is turned off, though the temperature is regulated to maintain an optimal 870° C. The temperature is maintained with a continuous stream of cool, ambient air injected through the bottom of the reaction chamber to maintain suspension of the catalytic media.

Example 2

During conversion of organic waste materials, it was realized that a significant amount of energy was being produced due to the increase and maintenance of elevated temperatures. Accordingly, an experiment was conducted to determine whether energy could be produced from higher grade solid fuels in, such as coal or charcoal. It was hypothesized that the process can enhance the release of energy in coal or other carbon fuel sources and obtain more consistent and higher sustained temperatures.

First, a baseline experiment was conducted to determine how fast the temperature would rise and fall when the system is only injected with natural gas as the heating element. This experiment showed that with gas only, the systems temperature rose to 406° C., and without gas turned on, but with air blowing through, cooled to 350° C. within 2 minutes, 13 seconds.

Second, about 1½ lbs of charcoal were introduced into the reaction chamber using an elevated support. The system ran 20 minutes at 506° C.

Third, ½ lbs of charcoal were introduced into the reaction chamber onto the elevated support, and temperature measurements in the reaction zone were taken every minute.

The foregoing experiment only used ½ lb of charcoal and the system maintained a fairly consistent temperature range for the first 8 minutes. However, it is believed that the silica bed began to get clumped up, which sometimes occurs and underlines the importance of airflow diffusion and sufficient suspension of the catalytic media without the media clumping. When media clumping occurs, the uneven flow of air seems to slow down the conversion reaction and possible the generation of reactive species from the catalytic media. At minute 17, the system cooled down to the point that it started automatically injecting gas, but temperature continued to drop because of the uneven air flow. Then at minute 21, the airflow pressure was increased and this restored the silica and air flow. About 2 minutes later the gas went off, and there was another 8 minutes of sustained high temperature, which was even better than the first part of the experiment, until the all the material was depleted and the experiment was stopped.

From the foregoing, it can be determined that a very small amount of organic material can maintain and even obtain a high temperature for a significant amount of time. It can also be determined that since the reaction chamber is continuously being injected with cold air, the organic material can sustain complete combustion, which further highlights the consistency of the organic material maintaining a high temperature. The baseline test shows that the air will rapidly cool the system from 406° C. to 350° C. in 2 minutes because of the temperature of the air injected. Additionally, a proper flow of air through the silica bed appears to be important for maintaining the conversion reaction and high temperature. When the airflow is disrupted, the conversion reaction appears to lessen and the temperature goes down, but much slower than the base line, which suggests that partial flow provides a partial conversion reaction. Furthermore, it is thought that recirculation of exhaust gases or introducing hot air into the system may significantly increase the temperature and energy production because it will eliminate the cooling effect of cold air. Moreover, the conversion reaction occurs above the silica bed such that the silica bed can now be reused without cleaning and removing remains of the organic material. Thereafter, the elevated support can be cleaned and/or removed to remove the remains of the organic material.

It is thought that through the airflow having hydroxyl radicals, supercritical water, muons and/or other reactive species can interact with the organic material in order to combust or otherwise react with the organic matter, and thereby convert the organic materials into high amount of thermal energy.

The presently described systems and methods can be used for a low carbon dioxide output process for producing electricity. Such a system and method can use a fraction of the volume of carbon fuel (e.g., coal) to obtain an equal amount of energy.

Moreover, the presently described systems and methods can be useful for converting low grade fuel, trash, organic materials, or the like into high grade clean energy.

Example 3

10 lbs of Appalachian hard coal was tested in the center level of the invention. Once the 540 C temperature was reached, the gas was shut off and the coal introduced into the device. The process ran for 90 minutes and maintained a temperature of 540 C to 570 C. without the natural gas. At the end of the experiment, the weight of the coal had been reduced from 10 lbs to 1 lb 8 oz and substantial amounts of energy had been released with virtually no ash or emissions. The remaining material was inert and inflammable.

Example 4

A semiconductor material for use in making microprocessors, computer chips, transistors, or photovoltaic solar cells is manufactured by providing a substrate, such as those commonly used in the semiconductor industry, and forming or depositing a single layer of a monomolecular nano film comprised of aligned carbon molecules having dimensions of 30 angstroms by 50 angstroms and that elongate to 70 angstroms at high pressure resulting in substantial increase in temperature resistance, and operating capabilities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

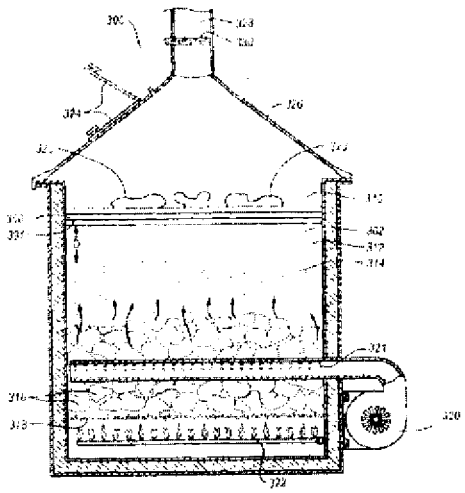

What is claimed is:

1. A method for destroying medical waste and/or converting organic materials into thermal energy and/or electrical energy, the method comprising:
   providing a reactor comprising:
      a reaction chamber;
      a heat source in communication with the reaction chamber;
      an air source fluidly coupled with the reaction chamber;
      a catalytic media located within the reaction chamber so as to receive heat from the heat source and airflow from the air source; and
      an opening through the reaction chamber through which medical waste and/or organic material can be introduced into the reaction chamber;
   introducing heat and airflow into the reaction chamber so as to heat the reaction chamber to a first desired temperature;

introducing medical waste and/or organic material into the reaction chamber and converting the medical waste and/or organic material into a fuel within the reaction chamber in the presence of the catalytic media, the fuel producing its own heat within the reaction chamber; and shutting off heat from the heat source while maintaining airflow to the reaction chamber, the heat from the fuel continuing to heat the reaction chamber so as to reach or maintain a second desired temperature that is the same or greater than the first temperature.

2. The method of claim 1, wherein the reaction chamber has a cross-sectional dimension of from about 1 feet to about 100 feet.

3. The method of claim 1, wherein the catalytic media within the reaction chamber includes a bed of particles that produce reactive species within the reaction chamber.

4. The method of claim 3, wherein the particles are selected from silica sand, silica gel, hydroxylbastnasite, alumina, and combinations thereof.

5. The method of claim 3, further comprising forming a monomolecular film on an interior surface of the reaction chamber.

6. The method of claim 5, the monomolecular film on the interior surface of the reaction chamber enhancing formation of hydroxyl radicals, supercritical water, muons and/or other reactive species within the reaction chamber.

7. The method of claim 1, wherein the medical waste and/or organic material comprises at least one member selected from the group consisting of organic waste, coal, fossil fuels, biomass, municipal waste, biological waste, cells, viruses, bacteria, severed tissue, blood, corpses, and combinations thereof.

8. The method of claim 1, further comprising introducing additional heat to the reaction chamber from the heat source if the temperature within the reaction chamber drops below a predetermined minimum temperature.

9. The method of claim 1, wherein the airflow includes unheated air.

10. The method of claim 1, further comprising:
providing a heat exchanger element thermally coupled with the reaction chamber;
passing a heat exchanger fluid through the heat exchanger element so that heat produced within the reaction chamber heats the heat exchanger fluid; and
generating electricity from the heated heat exchanger fluid.

11. The method of claim 10, wherein electricity is generated from a steam generator thermally coupled with the heat exchanger element.

12. The method of claim 1, further comprising:
causing or allowing a plasma reaction to occur in the reaction chamber; and
producing electrical energy from the plasma reaction.

13. The method of claim 1, further comprising generating inert inorganic sterile materials from the medical waste and/or organic material.

14. The method of claim 1, wherein converting medical waste and/or organic material comprises reducing and eliminating pollutants from diesel exhaust and increasing efficiency and output of a diesel engine.

15. The method of claim 1, wherein converting medical waste and/or organic material comprises reducing and eliminating pollutants and emissions from and increasing efficiency of a coal fired electrical generation system.

16. The method of claim 1, wherein converting medical waste and/or organic material comprises reducing and eliminating pollutants and emissions from a commercial waste incineration system.

17. The method of claim 1, further comprising forming a monomolecular film on at least one substrate in communication with the reaction chamber.

18. The method of claim 17, wherein the at least one substrate is selected from the group consisting of tools, electrical transmission wires, aircraft wing surface, and munitions.

19. The method of claim 17, the monomolecular film comprising a semiconductor material.

20. The method of claim 19, wherein the semiconductor material is suitable for use in making microprocessors, computer chips, transistors, or photovoltaic solar cells.

21. The method of claim 20, the method forming a semiconductor chip comprising:
the substrate; and
a single layer of the monomolecular nano film comprised of aligned carbon molecules having dimensions of 30 angstroms by 50 angstroms and that elongate to 70 angstroms at high pressure resulting in substantial increase in temperature resistance and operating capabilities.

22. A method for converting organic materials into thermal and electrical energy, the method comprising:
providing a reactor comprising:
a reaction chamber;
a heat source in communication with the reaction chamber;
an air source fluidly coupled with the reaction chamber;
a catalytic media located within the reaction chamber so as to receive heat from the heat source and airflow from the air source; and
an opening through the reaction chamber through which medical waste and/or organic material can be introduced into the reaction chamber;
introducing heat and airflow into the reaction chamber so as to heat the reaction chamber to a first desired temperature;
introducing organic material into the reaction chamber and converting the organic material into a fuel within the reaction chamber in the presence of the catalytic media, the fuel producing its own heat within the reaction chamber;
shutting off heat from the heat source while maintaining airflow to the reaction chamber, the heat from the fuel continuing to heat the reaction chamber so as to reach or maintain a second desired temperature that is the same or greater than the first temperature; and
producing or collecting electrical energy.

23. The method of claim 22, wherein producing or collecting electrical energy comprises:
providing a heat exchanger element thermally coupled with the reaction chamber;
passing a heat exchanger fluid through the heat exchanger element so that heat produced within the reaction chamber heats the heat exchanger fluid; and
generating electricity from the heated heat exchanger fluid.

24. The method of claim 22, wherein producing or collecting electrical energy comprises:
causing or allowing a plasma reaction to occur in the reaction chamber; and
collecting electrical energy from the plasma reaction.

25. A method for converting organic materials into thermal energy and, the method comprising:
providing a reactor comprising:
a reaction chamber;
a heat source in communication with the reaction chamber;
an air source fluidly coupled with the reaction chamber;

a catalytic media located within the reaction chamber so as to receive heat from the heat source and airflow from the air source; and an opening through the reaction chamber through which medical waste and/or organic material can be introduced into the reaction chamber;

introducing heat and airflow into the reaction chamber so as to heat the reaction chamber to a first desired temperature;

introducing organic material into the reaction chamber and converting the organic material into a fuel within the reaction chamber in the presence of the catalytic media, the fuel producing its own heat within the reaction chamber;

shutting off heat from the heat source while maintaining airflow to the reaction chamber, the heat from the fuel continuing to heat the reaction chamber so as to reach or maintain a second desired temperature that is the same or greater than the first temperature; and providing a monomolecular film on at least one substrate in communication with the reaction chamber, the monomolecular film comprising a semiconductor material.

26. The method of claim 25, wherein the semiconductor material comprises comprising:

the substrate; and a single layer of the monomolecular nano film comprised of aligned carbon molecules having dimensions of 30 angstroms by 50 angstroms and that elongate to 70 angstroms at high pressure resulting in substantial increase in temperature resistance and operating capabilities.

* * * * *

UNITED STATES PATENT AND TRADEMARK OFFICE
CERTIFICATE OF CORRECTION

Page 1 of 5

PATENT NO. : 8,512,215 B2
APPLICATION NO. : 13/290069
DATED : August 20, 2013
INVENTOR(S) : Maganas It is certified that error appears in the above-identified patent and that said Letters Patent is hereby corrected as shown below:

Delete the Title Page, and substitute therefor the attached Title Page

In the Drawings
Sheet 2, replace Figure 2 with the figure depicted below, wherein label 210 and label 216 are modified to 200 and 210, respectively

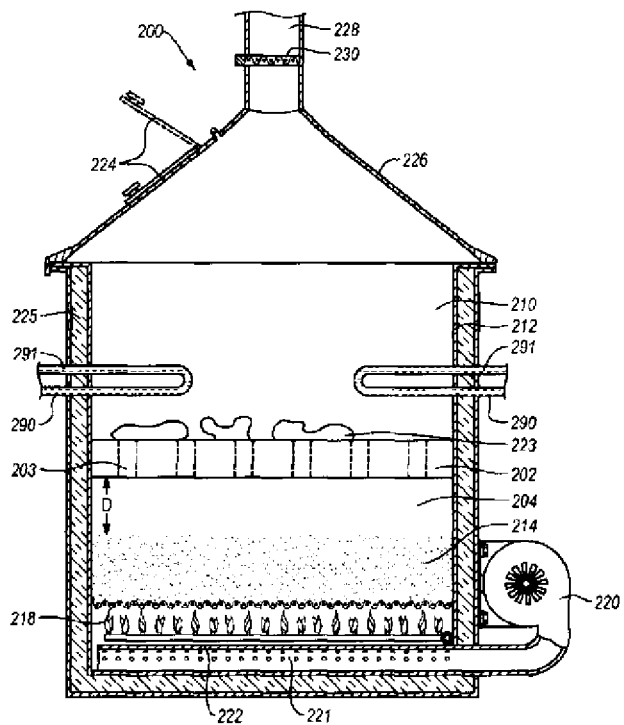

Fig. 2

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,512,215 B2

Sheet 3, replace Figure 3 with the figure depicted below, wherein the label 310 is modified to 300, the label 316 is modified to 310, the label 320 is modified to 321, and the positions of labels 314 and 320 are adjusted

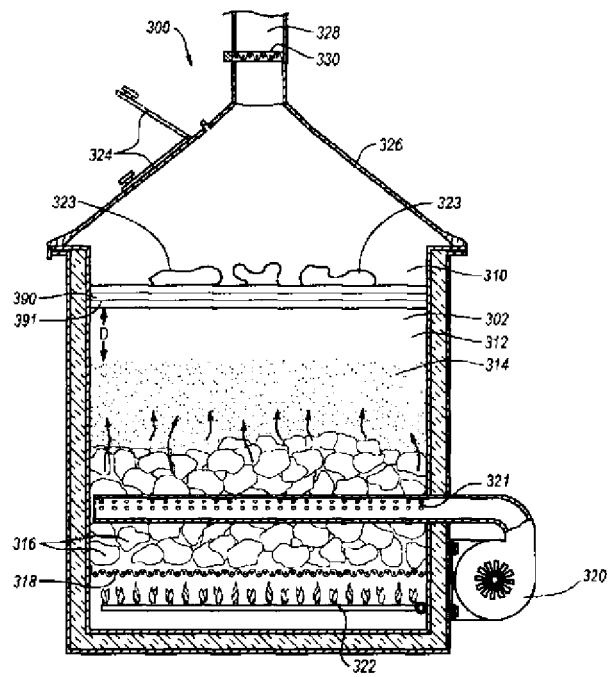

Fig. 3

Sheet 4, replace Figure 4A and Figure 4B with the figure depicted below, wherein the label 409 is omitted from the drawing

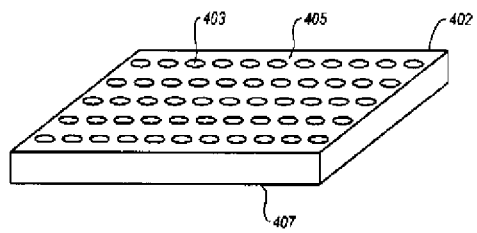

Fig. 4A

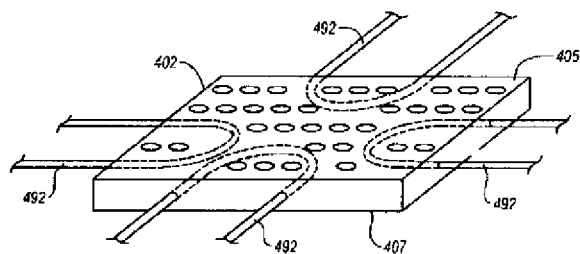

Fig. 4B

In the Specifications

Column 3
Line 56, change "a weight loss of about 80% weight loss" to --a weight loss of about 80%--

Column 4
Line 34, change "operating capabilities" to --operating capabilities.--

Column 5
Line 57, change "blood is most water" to --blood is mostly water--

Column 6
Line 3, change "that generate and/or release energy" to --that generates and/or releases energy--

Column 7
Line 2, change "weight loose" to --weight loss--

Column 8
Line 4, change "that is left over" to --that are left over--
Line 10, change "Tom Maganas process of eliminating" to --Tom Maganas' process eliminates--
Line 29, change "Maganas Plasma transformation" to --Maganas' plasma transformation--
Line 67, change "catalytic media" to --catalytic media 114--

Column 9
Line 13, change "support element 112" to --support element 102--
Line 17, change "separate the media 114" to --separate the catalytic media 114--

Column 10
Line 7, change "catalytic media" to --catalytic media 114--
Line 14, change "catalytic media" to --catalytic media 114--
Line 36, change "to a partially suspend" to --to partially suspend--

Column 11
Line 38, change "biological materials 102" to --biological materials 123--

Column 12
Line 23, change "generation source 120" to --generation source 122--
Line 24, change "air source 122. The heat generation source 120" to --the air source 120. The heat generation source 122--
Line 27, change "air source 122" to --air source 120--
Line 30, change "generation source 120" to --generation source 122--
Line 58, change "naturally contain" to --naturally contains--
Line 67, change "and an support element" to --and a support element--

Column 13
Line 23, change "reaction chamber" to --reaction chamber 212--
Line 24, change "reaction zone 216" to --reaction zone 210--
Line 39, change "reaction zone 216" to --reaction zone 210--
Line 59, change "An support element" to --A support element--

Column 14
Line 17, change "reaction zone 316" to --reaction zone 310--
Line 19, change "reaction zone 316" to --reaction zone 310--
Line 20, change "an support" to --a support--
Line 25, change "bottom surface" to --bottom surface 407--
Line 29, change "FIG. 1A" to --FIG. 4A--
Line 41, change "substrates 402*a,b*" to --substrates 402*a* and 402*b*--
Line 45, change "substrates 402*a,b*" to --substrates 402*a* and 402*b*--
Line 48, change "substrates 402*a,b*" to --substrates 402*a* and 402*b*--
Line 51, change "substrates 402*a,b*" to --substrates 402*a* and 402*b*--

Column 15
Line 34, change "would certain increase" to --would certainly increase--

Column 16
Line 58, change "well known" to --well-known--

Column 18
Line 53, change "which passes through" to --which passed through--

Column 19
Line 13, change "higher grade solid fuels in" to --higher grade, solid fuels--
Line 21, change "the systems temperature" to --the system's temperature--
Line 40, change "minute 17" to --minute 17--
Line 42, change "minute 21" to --minute 21--

Column 20
Line 22, change "540 C" to --540° C.--
Line 23, change "coal introduced" to --coal was introduced--
Line 25, change "540 C to 570 C." to --540° C. to 570° C.--
Line 40, change "in substantial increase" to --in a substantial increase--

CERTIFICATE OF CORRECTION (continued)

(12) United States Patent
Maganas

(10) Patent No.: US 8,512,215 B2
(45) Date of Patent: *Aug. 20, 2013

(54) METHOD FOR ENHANCED ENERGY PRODUCTION FROM TRANSFORMING, REDUCING AND ELIMINATING ORGANIC MATERIAL AND MEDICAL WASTE

(76) Inventor: Thomas C. Maganas, Manhattan Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/290,069

(22) Filed: Nov. 5, 2011

(65) Prior Publication Data

US 2013/0086905 A1 Apr. 11, 2013

Related U.S. Application Data

(63) Continuation-in-part of application No. 13/253,804, filed on Oct. 5, 2011, now Pat. No. 8,283,512.

(51) Int. Cl.
*B09B 3/00* (2006.01)
(52) U.S. Cl.
USPC ........ 588/249.5; 588/301; 588/311; 588/313; 201/19; 422/186
(58) Field of Classification Search
CPC ........... B09B 3/0075; F23G 5/00; F23G 5/30
USPC ............... 588/313, 249.5, 311, 301; 165/74; 422/186; 201/19
See application file for complete search history.

(56) References Cited

U.S. PATENT DOCUMENTS

| | | |
|---|---|---|
| 2,956,865 A | 10/1960 | Williams, Sr. |
| 3,632,304 A | 1/1972 | Hardison |
| 3,714,071 A | 1/1973 | Michalko |
| 3,841,242 A | 10/1974 | Sigg |
| 3,915,890 A | 10/1975 | Soldate |
| 3,922,975 A | 12/1975 | Reese |
| 4,052,173 A | 10/1977 | Scholz |
| 4,308,806 A | 1/1982 | Uemura et al. |
| 4,330,513 A | 5/1982 | Hunter et al. |
| 4,392,346 A * | 7/1983 | Fink .................. 60/774 |

(Continued)

FOREIGN PATENT DOCUMENTS

| | | |
|---|---|---|
| EP | 0176123 | 4/1986 |
| EP | 0605719 | 7/1994 |

(Continued)

OTHER PUBLICATIONS

Shafey et al. Experimental Study on a Bench-Scale, Batch-Type Fluidized-Bed Combustor for Energy Production From Waste-Derived Fuels, 331-338, Energy, vol. 17, No. 4 (1992).

(Continued)

*Primary Examiner* — Nina Bhat
(74) *Attorney, Agent, or Firm* — Workman Nydegger

(57) ABSTRACT

A waste transformation and destruction apparatus includes a natural gas ignition system, a silica material bed, a heat transfer device, and a system for collecting plasma produced energy. A reaction formed by heat from ignition, carbon from the waste material, supercritical water, --OH radicals, and muons released from the silica bed transform the waste into a fuel. This fuel is more efficiently consumed by the complete combustion process resulting in near total elimination of the waste, increased energy production, and virtually no emissions.

26 Claims, 5 Drawing Sheets